Feb. 12, 1952     W. M. HOLLAND     2,585,126
RAILROAD CAR FOR TRANSPORTING ROAD VEHICLES
Filed March 29, 1949     2 SHEETS—SHEET 1
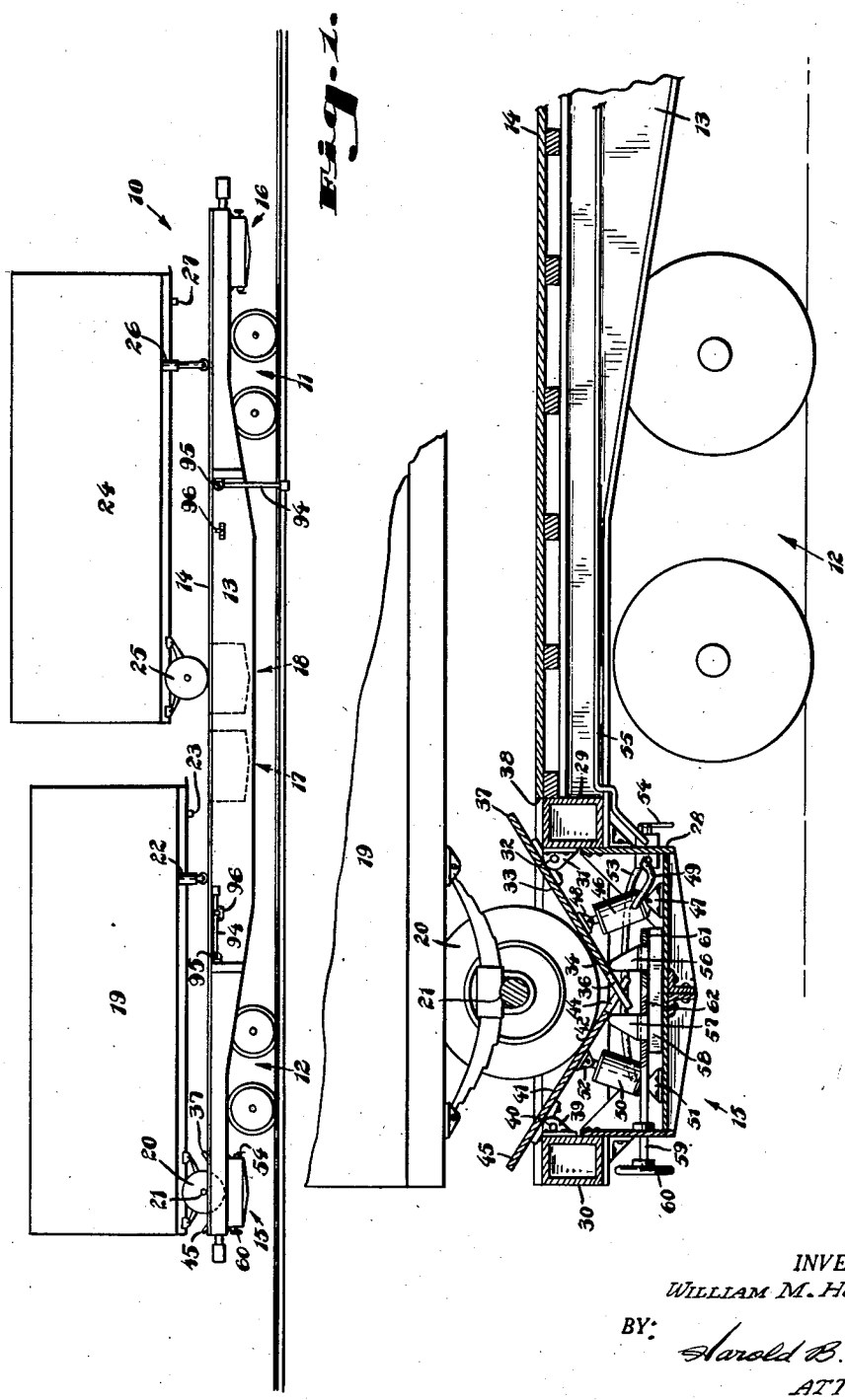
INVENTOR.
WILLIAM M. HOLLAND,
BY: Harold B. Hood.
ATTORNEY.

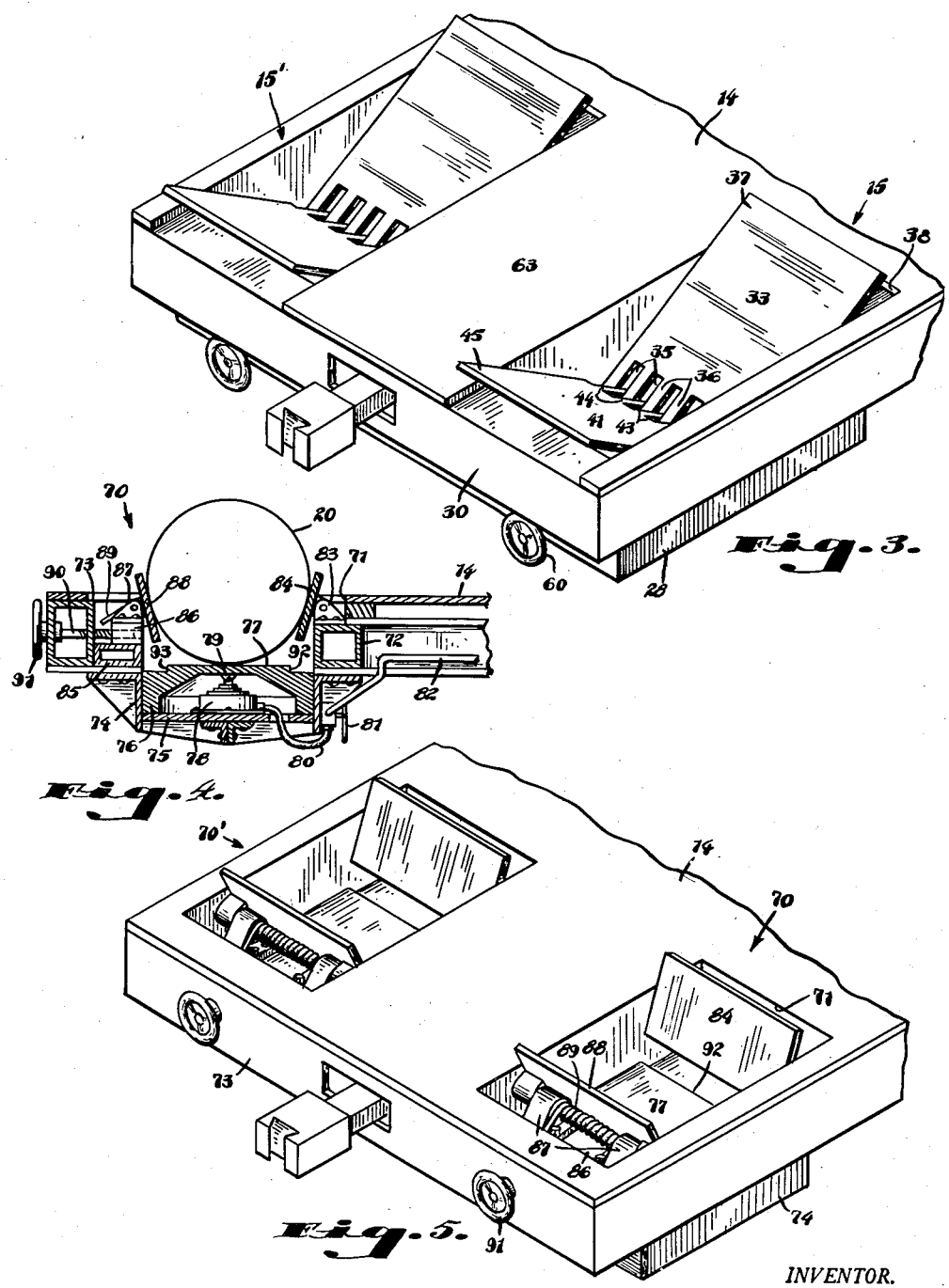

Patented Feb. 12, 1952

2,585,126

UNITED STATES PATENT OFFICE 2,585,126

RAILROAD CAR FOR TRANSPORTING ROAD VEHICLES

William M. Holland, Indianapolis, Ind.

Application March 29, 1949, Serial No. 84,053

13 Claims. (Cl. 105—368)

The present invention relates to a railroad car provided with specific details of construction adapting it for transporting road vehicles such as freight trailers and more particularly semi-trailers. Myriad reasons exist for hauling loaded freight carriers of this character, between cities, by rail, rather than over the highways. Weight and length limitations imposed by the laws of the various states radically limit the types of loads which may be transported over the highways. Vehicles carrying heavy loads and moving over the highways at relatively high speeds cause serious damage to such highways, whereas the same vehicles with the same loads, moving at the relatively low speeds imposed by urban regulations will not damage the differently constructed city streets.

Goods loaded into trailers adapted for road travel can be conveniently delivered to points of storage or use, or can be loaded at points of manufacture or supply, so that the road trailer type of vehicle is essential to complete the transportation of such goods from points of supply to points of use. If those goods are transported, between cities, in or on railroad cars of standard construction, it becomes necessary, of course, to load the goods onto trucks or trailers at the point of supply, carry them to a railroad depot, there unload them from the road vehicle and, either concurrently or subsequently, load them onto railroad cars; then transport them to the city of use by rail and there unload them from the railroad cars, load them onto road vehicles, transport them to the point of use, and there again unload them. The enormous advantage, in both time and labor, which can be attained by transporting the loaded road vehicle between cities will be obvious.

It is the primary object of my invention, then, to provide a railroad car specifically designed and constructed to accommodate loaded road vehicles for transportation between cities. It will be obvious that it would not be feasible simply to run such a vehicle onto a standard flatcar and to allow it to stand on the deck of the car during such transportation, since the problem of anchoring the vehicle to the car deck in such a fashion as to ensure a safe ride, in spite of the jolts and jerks and centrifugal forces to which it would be subjected during such transportation, would be so difficult as to render such a procedure impractical. The present invention, therefore, is primarily concerned with the provision of means whereby road vehicles can be effectively positioned and anchored upon a railroad car for interurban transportation.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a more or less diagrammatic side elevation of a railroad car constructed in accordance with the present invention, showing two freight semi-trailers supported thereon;

Fig. 2 is an enlarged fragmentary view of such car and a portion of one of the trailers, the well structure of the present invention being illustrated in longitudinal section;

Fig. 3 is a perspective view of one form of well structure of the character illustrated in Fig. 2;

Fig. 4 is a fragmentary section showing a modified form of well structure; and

Fig. 5 is a fragmentary perspective of the form of well structure illustrated in Fig. 4.

Referring more particularly to the drawings, it will be seen that I have indicated by the reference numeral 10 a railroad flatcar comprising trucks 11 and 12 suitably supporting a frame 13 upon which is carried a deck 14. Wells, indicated generally by the reference numerals 15, 16, 17 and 18, are built into the car 10; the wells 15 and 16 being located closely adjacent the opposite ends of the frame, and the wells 17 and 18 being located near the longitudinal center of the frame, the well 17 being slightly spaced from such center in one direction and the well 18 being similarly spaced therefrom in the opposite direction. The various well units may be identical in construction, and therefore the details of the well 15 only have been illustrated and will be described.

A semi-trailer 19 of conventional construction is shown as being carried near one end of the deck 14, its wheels 20 being sunk in the well 15 to a degree sufficient to bring its axle 21 substantially to the level of the deck 14. In accordance with standard practice, the front end of the trailer 19 is supported upon a hydraulic dolly leg 22; and I have roughly indicated coupler means 23 adapted to be cooperatively associated with the fifth wheel of a conventional tractor.

I have shown a second trailer 24 supported upon the deck 14 near the forward end thereof. It will be seen that its wheels 25 are in registry with the well 18, its front end being supported upon a dolly leg 26; and I have indicated coupler means for the trailer 24 at 27.

Ideally, the right-hand end of the car 10 will be brought to juxtaposition with a loading platform, and the trailer 19, coupled to a tractor, will be backed onto the deck 14 from such loading platform, and will be moved to the remote end of the deck 14 until its wheels 20 register with the well 15. The tractor will now be uncoupled and driven off the car, whereafter the wheels 20 will be lowered to their illustrated positions by operation of the well mechanism later to be described, while the front end of the trailer will similarly be lowered by operation of the dolly leg 22. The trailer 19 may, if desired, be further anchored to the car 10 by any suitable means.

After the trailer 19 has been positioned, and either before or after it is lowered in the manner above described, the trailer 24 will be backed onto the car 10 to bring its wheels 25 into registry with the well 18. After the tractor is uncoupled from the trailer 24 and removed from the car, the trailer 24 will be lowered, in a similar manner, into a position corresponding to that in which the trailer 19 is shown.

Obviously, only the wells 15 and 18 will be used when the car is loaded in the illustrated manner; but the wells 16 and 17 are preferably provided so that the car may be similarly loaded from its opposite end.

Referring, now, to Figs. 2 and 3, it will be seen that the well 15 comprises a housing or frame 28 suitably supported upon the car frame 13 beneath the level of the deck 14, and in registry with an opening 38 in such deck. Preferably, the front and rear edges of such opening will be defined by transverse beams 29 and 30 to which the frame 28 is hung. Brackets 31 are secured to the beam 29 and support a transverse bearing 32 upon which is hingedly mounted a platform leaf 33. The leaf brackets mounted on said bearing depend from the under surface of the leaf 33 intermediate the edges of said leaf but more remote from the rear edge 34 than from the forward edge 37 thereof. Preferably, the rear edge of the leaf 33 is slotted as at 35 to define rearwardly projecting, transversely spaced furcations 36 at said edge.

Brackets 39, similar to the brackets 31, are hung from the beam 30 to support a transverse bearing 40 on which a leaf 41 similar to the leaf 33 is hingedly mounted, the forward edge 42 of said leaf 41 being slotted at 43 to define forwardly projecting, laterally spaced furcations 44 interdigitating with the furcations 36 of the plate 33.

A fluid motor 46 is pivotally supported upon a bracket 47 secured to the floor of the frame 28, and the piston of said motor is pivotally connected to a bracket 48 secured to the under surface of the leaf 33. A suitable hose 49 indicates means for supplying fluid under pressure to the motor 46. A similar motor 50 is similarly connected between a bracket 51 on the floor of the frame 28 and a bracket 52 on the under surface of the leaf 41, a supply hose for the motor 50 being indicated at 53. If desired, the supply of fluid to the motors 46 and 50 may be controlled by a valve 54 connected in the air line 55 normally present in a car of the character here under consideration. Alternatively, the motors 46 and 50 may be supplied from any suitable reservoir containing either air or liquid under pressure, or arrangements may be provided for pumping air or liquid to the motors 46 and 50, or exhausting air or liquid therefrom, through any suitable auxiliary manual means (not shown).

It will be readily perceived that the leaves 33 and 41 may assume positions in which they lie flush with the surface of the deck 14, completely closing the opening 38. The leaves will be so positioned as a trailer 19, for instance, is moved onto the car. Each of the leaves 33 and 41 may extend transversely substantially from one lateral edge of the car to the other; or alternatively, and I now believe preferably, each well unit will have a lateral dimension only sufficient to accommodate one vehicle wheel, a unit 15' being aligned with the unit 15 and being arranged to operate conjointly therewith, said units 15 and 15' being separated by a solid continuation 63 of the deck 14.

When the wheels of the trailer 19 have been located upon the leaves 33 and 41, fluid will be controllably exhausted from the motors 46 and 50 to permit the leaves 33 and 41 to swing about their bearings 32 and 40 toward the positions illustrated in Fig. 2; and such movement will be continued until the axle 21 is lowered substantially to the level of the deck 14. I presently believe that it may be desirable to cause the axle 21 to come to rest upon the deck continuation 63; but whether or not the axle is permitted to rest upon the deck, the leaves 33 and 41 will be held in solid engagement with the wheels 20, whereby the vehicle 19 will be effectively held against movement longitudinally of the car 10.

Particularly if the weight of the vehicle 19 is not permitted to come to rest upon the deck extension 63, I believe that it will be desirable not to force the motors 46 and 50 to sustain the entire pressure exerted by the wheels 20 against the leaves 33 and 41, during transportation of the car 10; and therefore I preferably provide abutment means for sustaining the load upon said leaves while in their depressed positions. Since wheel diameters of freight trailers vary to some degree, it will be preferable to provide abutment means which can be adjusted to sustain the leaves 33 and 41 in various degrees of depression. In the illustrated embodiment of my invention, I have shown abutment elements 56 and 57 slidably supported upon a base 58, and a screw shaft 59 operatively engaging said abutment elements 56 and 57. The screw shaft 59 will preferably be provided with the hand wheel 60 projecting into an accessible position at the end of the car, and said shaft is provided with a left-hand thread 61 cooperatively engaging the element 56, and a right-hand thread 62 cooperatively engaging the element 57. It will be clear that, if the hand wheel 60 is rotated in a counterclockwise direction, as viewed from the left of Fig. 2, the elements 56 and 57 will be moved toward each other, while rotation of the hand wheel in the opposite direction will move the elements 56 and 57 away from each other.

The trailer 19 will preferably be "spotted" with its axle 20 vertically above the median plane parallel to the bearings 32 and 40; and even if it is not accurately located, it will seek the specific position illustrated in Fig. 2 as the leaves 33 and 41 begin to sink, since the wheels 20 will roll downwardly upon either of said leaves, into the crotch therebetween, the dolly leg 22 being wheeled as shown. The interdigitation between the furcations 36 and the furcations 44 strengthens the assembly, the proportioning of the parts being such that the stated interdigitation is maintained throughout the operative paths of movement of the leaves. Preferably, the upper surfaces of the leaves 33 and 41 will be heavily greased to facilitate slippage of the wheels 20 over the surfaces thereof as the leaves are caused to swing between their positions illustrated in Fig. 2 and positions flush with the deck 14. Of course, when the rail destination has been reached, the motors 46 and 50 will be energized to lift the leaves into such flush relation with the deck 14, whereafter the trailers may be coupled to tractors and so drawn off the car 10.

In Figs. 4 and 5, I have illustrated a modified form of well unit, indicated generally by the reference numeral 70. As before, the deck 14 is provided with an opening 71 for each well unit, such opening being bounded by beams 72 and 73 from which a frame 74, having a floor 75, is supported. A block 76 is guided in said frame for vertical reciprocation between its illustrated position and a position in which its uppermost surface 77 is flush with the deck 14. A fluid motor 78 is supported upon the frame floor 75 and is connected to a suitable bracket 79 on the block 76 to cause reciprocation of said block. A hose 80 is connected to supply fluid to the motor 78, the flow of fluid being controlled by a valve 81 from the air line 82 or from any suitable source, as described above.

Brackets 83 provide a hinged mounting, adjacent the forward edge of the opening 71, for a guard plate 84 which is swingable between its illustrated position and a position in which it is flush with the deck 14. Near the rear edge of the opening 71, there is mounted a trackway 85 upon which is reciprocably slidably supported a block 86 carrying brackets 87 hingedly mounting a second guard plate 88 which is likewise shiftable between its illustrated position and a position flush with the deck 14. Springs 89, only one of which is shown, are preferably associated with the plates 84 and 88, resiliently urging said plates to positions flush with the deck 14.

A screw shaft 90, having a hand wheel 91 accessibly projecting through an end of the car frame, operatively engages the block 86, said screw shaft being rotatable in opposite directions to adjust the block 86 and the plate 88 carried thereon toward and away from the plate 84.

As is clearly illustrated in Fig. 4, the block 76 is provided with recesses 92 and 93 for the accommodation of the adjacent edges of the plates 84 and 88. It will be clear that, when the block 76 is in its uppermost position, the adjacent edges of said plates are supported in said recesses 92 and 93.

In Fig. 5 I have shown an arrangement in which the well 70 accommodates only one wheel of the vehicle, and a companion well unit 70' accommodates the companion wheel of such vehicle.

As described above, the trailer will be spotted on the car with its wheels supported upon the blocks 76 of the units 70 and 70', the surfaces 77 of said blocks being, at such time, flush with the deck 14. Now, fluid is exhausted from the motors 78 to permit the blocks 76 to sink under control of said motors. As the wheels 20 move downwardly, with the blocks 76, the plates 84 and 88 will be tilted about their hinged mountings until, when each block 76 engages the floor 75 of the frame 74, the parts will be in the positions illustrated in Fig. 4. If, under these circumstances, it is found that the spacing between the plates 84 and 88 is too wide, the hand wheel 91 will be rotated to move the block 86 toward the right, whereby the wheel 20 will be gripped between the plates 84 and 88.

As has been said hereinabove, ideally the vehicles 19 and 24 will be loaded on and removed from the car 10 from one end thereof. In certain yards, however, it will be found that such loading or unloading will be impossible or inconvenient, and that it will be necessary to load or unload the vehicles laterally from the car. The frame 13, of course, is sprung upon the trucks 11 and 12; and if the vehicles 19 and 24 are heavily loaded, movement thereof away from the center of the car might cause the car frame to tip to a substantial degree. I therefore prefer to provide prop means 94 to be permanently carried upon the car. As illustrated, a prop element 94 is pivotally secured upon a bracket 95 at each side of the frame 13 near each end thereof, and is swingable between the position illustrated at the right-hand end of the car, in which the element 94 will act to prevent substantial depression of the near side of the car, and the position illustrated near the left-hand end of the car in which the element 94 is held away from the floor by suitable latch means 96. Preferably, the element 94, whose details of construction form no part of the present invention, will be of adjustable length.

I claim as my invention:

1. A railroad car comprising a load-supporting deck and platform means movable between a position flush with said deck and a position in which at least a portion of said platform means is depressed below said deck, such platform means being adapted to support a wheel of a road vehicle; and means operable to move said platform means, while supporting such a wheel, from either of such positions to the other, said platform means including means engaging such wheel, when said platform means is in its depressed position, to restrain such wheel against movement longitudinally of the car.

2. A railroad car for transporting road vehicles, comprising a load-supporting deck, well means adjacent each end of said deck, well means near the center of length of said deck, and platform means for each well means, each such platform means comprising an element adapted to support a vehicle wheel and means for moving said element between a position flush with said deck and a position in which at least a portion of said element is disposed at a level substantially below said deck, the platform means for said well means near the center of length of said deck comprising an element spaced slightly in one direction from such center and an independent element spaced slightly in the opposite direction from such center, and the moving means for said last-named elements being independent.

3. In a railroad car having a load-supporting deck provided with an opening therein, platform means effective, at times, to close such opening comprising a leaf hingedly mounted adjacent the forward edge of such opening, a leaf hingedly mounted adjacent the rear edge of such opening, said leaves projecting from their hinged mountings toward each other and cooperating with each other, when said leaves are flush with said deck, to close said opening, and means engaging said leaves in regions between the hinged mountings thereof, for swinging said leaves about their hinged mountings to move the mutually projecting portions thereof between such flush position and positions below the level of said deck.

4. The device of claim 3 in which said last-named means comprises a fluid motor for each leaf.

5. The device of claim 4 including positive stop means for each leaf acting to support such leaf when in its lowered position.

6. The device of claim 5 in which such stop means comprises an abutment element for each leaf and means for concurrently shifting said abutment elements toward or away from the median plane parallel with the axes of said hinged mountings.

7. The device of claim 6 in which said last-named means comprises a screw shaft having a right-hand thread operatively engaging one of said abutment elements and a left-hand thread operatively engaging the other of said abutment elements.

8. The device of claim 3 in which that edge of each leaf adjacent the other leaf is provided with a plurality of furcations interdigitating with the furcations of the other leaf throughout the swinging paths of said leaves.

9. In a railroad car having a load-supporting deck provided with an opening therein, platform means effective, at times, to close such opening comprising a vehicle wheel-supporting block, means for guiding said block for vertical reciprocation between a position in which its uppermost surface is flush with said deck and a position in which said uppermost surface is substantially below said deck, means for shifting said block between said positions, and a guard plate hingedly mounted adjacent the forward edge of such opening and a guard plate hingedly mounted adjacent the rear edge of such opening, said guard plates swinging, upon lowering of said block, into positions engaging a wheel supported on said block to hold such wheel against movement longitudinally of said car.

10. The device of claim 9 including means for adjusting one of said plates and its hinged mounting toward and away from the other of said plates and its mounting.

11. The device of claim 9 in which said guard plates are swingable into and out of positions flush with said deck, and including means resiliently urging said plates toward such positions.

12. The device of claim 9 in which said block engages the adjacent edges of said plates, when said uppermost block surface approaches a flush relation with said deck, to support said plates against movement about the axes of their hinged mountings.

13. In a railroad car having a load-supporting deck, means for retaining a wheeled vehicle supported on said deck against substantial movement longitudinally of said deck comprising a device shiftable in a generally vertical direction relative to the upper surface of said deck, between a position substantially flush with such surface, in which the wheels of such a vehicle are free to move in either direction longitudinally of such deck, and a position at a different level, in which said device positively engages said wheels to block the same against movement in either direction longitudinally of such deck.

WILLIAM M. HOLLAND

REFERENCES CITED

The following references are of record in the file of this patent:

UNITED STATES PATENTS

| Number | Name | Date |
| --- | --- | --- |
| 2,305,444 | Pond | Dec. 15, 1942 |
| 2,489,024 | Gaynor | Nov. 22, 1949 |
| 2,497,682 | Mertz | Feb. 14, 1950 |